(12) United States Patent
Li et al.

(10) Patent No.: US 11,950,029 B2
(45) Date of Patent: Apr. 2, 2024

(54) VIBRATING MIRROR ADJUSTMENT APPARATUS, SYSTEM AND METHOD, AND PROJECTOR

(71) Applicant: IVIEW DISPLAYS (SHENZHEN) COMPANY LTD., Shenzhen (CN)

(72) Inventors: Yong Li, Shenzhen (CN); Zhiqiang Gao, Shenzhen (CN); Steve Yeung, Shenzhen (CN); Tak Yeung, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 434 days.

(21) Appl. No.: 17/377,809

(22) Filed: Jul. 16, 2021

(65) Prior Publication Data

US 2021/0344884 A1    Nov. 4, 2021

Related U.S. Application Data

(63) Continuation of application No. PCT/CN2019/129266, filed on Dec. 27, 2019.

(30) Foreign Application Priority Data

Jan. 18, 2019   (CN) .......................... 201910051275.0

(51) Int. Cl.
*H04N 9/31* (2006.01)
*G02B 7/182* (2021.01)
*G03B 21/28* (2006.01)

(52) U.S. Cl.
CPC ........... *H04N 9/3188* (2013.01); *G02B 7/182* (2013.01); *G03B 21/28* (2013.01); *H04N 9/3152* (2013.01)

(58) Field of Classification Search
CPC .... H04N 9/3188; H04N 9/3152; G02B 7/182; G03B 21/28; G06V 10/42
See application file for complete search history.

(56) References Cited

U.S. PATENT DOCUMENTS

| 2005/0140930 A1* | 6/2005 | Dvorkis | ............... | H04N 13/337 |
| | | | | 348/E9.026 |
| 2008/0198334 A1* | 8/2008 | Kasazumi | ............... | G02B 27/48 |
| | | | | 353/38 |

(Continued)

FOREIGN PATENT DOCUMENTS

| CN | 103995416 A | | 8/2014 | | |
| CN | 106094409 A | * | 11/2016 | ........... | G03B 21/142 |

(Continued)

*Primary Examiner* — Magda Cruz
(74) *Attorney, Agent, or Firm* — IPRO, PLLC

(57) ABSTRACT

The present disclosure relates to a vibrating mirror adjustment apparatus, system and method, and a projector. The vibrating mirror adjustment apparatus includes: an image feature acquiring module, an image identifying module, a resolution extracting module, and a vibrating mirror control module. The vibrating mirror adjustment apparatus identifies the category of the projected image and the resolution information corresponding to the projected image based on the acquired information feature of the projected image, then identifies whether vibration of the vibrating mirror is used to improve a resolution of an image, and further automatically controls the on or off state of the vibrating mirror, such that an optimal projection display effect is achieved, and visual enjoyment of a user is greatly improved.

11 Claims, 7 Drawing Sheets

(56) References Cited

U.S. PATENT DOCUMENTS

2017/0061575 A1\* 3/2017 Mori .................... H04N 9/3185
2017/0111622 A1\* 4/2017 Guo ..................... H04N 9/3188

FOREIGN PATENT DOCUMENTS

| CN | 106125265 A | 11/2016 |
| CN | 106385575 A | 2/2017 |
| CN | 106990526 A | 7/2017 |
| CN | 107409192 A | 11/2017 |

\* cited by examiner

VIBRATING MIRROR ADJUSTMENT APPARATUS, SYSTEM AND METHOD, AND PROJECTOR

CROSS-REFERENCE TO RELATED APPLICATION

This disclosure is a continuation of International Patent Application No. PCT/CN2019/129266, filed on Dec. 27, 2019, which is based upon and claims priority of Chinese Patent Application No. 2019100512750, filed on Jan. 18, 2019, titled "VIBRATING MIRROR ADJUSTMENT APPARATUS, SYSTEM AND METHOD, AND PROJECTOR", the entire contents of which are incorporated herein by reference.

TECHNICAL FIELD

The present disclosure relates the technical field of projection display technologies, and in particular, relates to a vibrating mirror adjustment apparatus, system and method, and a projector.

BACKGROUND

With the advancement of science and technology, projection imaging devices are more and more extensively applied in people's life and work. A projection imaging device with a higher resolution achieves a better visual experience. The resolution of an image is an important indicator for measurement of image quality. A higher image resolution indicates that the image more approximates to a real scene. The resolution of the image is improved mainly by improving hardware or image processing software. Improvement of the hardware mainly refers to improvement of an imaging element and an optical system.

In the related art, a vibrating mirror is conventionally employed to improve the resolution. Generally, an individual key element or combined key elements are improved to an element capable of regularly vibrating as the vibrating mirror. According to persistence of vision (when an object rapidly moves, and after an image observed by human eyes disappears, the image may be still remained in the human eyes for 0.1 to 0.4 seconds), a projected image from a projection display chip is subjected to pixel offset after traveling through the vibrating mirror, and two images are generated. These two images may be superimposed within a visual effect to form a new image, such that brightness and resolution of the picture are improved.

During practice of the present disclosure, the inventors have found that the related art at least has the following technical problem: a projection apparatus capable of improving the resolution based on vibration of the vibrating mirror may have the defect of increasing noise of the projected image, and during projection of an image whose output resolution is less than or equal to a physical resolution of the projection display chip, the vibrating mirror may fail to better improve the resolution of the projected image. On the contrary, due to impacts caused by increased noise or image differences induced by vibrating mirror, the projection quality is affected, and thus visual experience of a user is degraded.

SUMMARY

With respect to the technical problem in the related art, objectives of the present disclosure are to provide an apparatus, a system, a method, and a projector that are capable of adjusting an on or off state of a vibrating mirror based on information of a projected image.

The objectives of the present disclosure are implemented by employing the following technical solutions:

In a first aspect, embodiments of the present disclosure provide a vibrating mirror adjustment apparatus. The apparatus includes:

an image feature acquiring module, configured to acquire information feature of a projected image;

an image identifying module, configured to identify a category of the projected image based on the information feature of the projected image;

a resolution extracting module, configured to extract resolution information corresponding to the projected image based on the category of the projected image;

an image comparing module, configured to acquire a comparison result between the resolution information of the projected image and a physical resolution of a projection display chip; and a vibrating mirror control module, configured to control an on or off state of the vibrating mirror based on the comparison result.

In some embodiments, the category of the projected image includes a static image, a local dynamic image, and a network playback dynamic image.

In some embodiments, when the image identifying module identifies that the projected image is the static image, the resolution extracting module is further configured to extract an output resolution of the static image; wherein when the output resolution of the static image is greater than the physical resolution of the projection display chip, the vibrating mirror control module is further configured to control the vibrating mirror to be turned on; or when the output resolution of the static image is less than or equal to the physical resolution of the projection display chip, the vibrating mirror control module is further configured to control the vibrating mirror to be turned off.

In some embodiments, when the image identifying module identifies that the projected image is the local dynamic image, the resolution extracting module is further configured to extract a resolution of the local dynamic image according to front-end information of the local dynamic image; wherein when the resolution of the local dynamic image is greater than the physical resolution of the projection display chip, the vibrating mirror control module is further configured to control the vibrating mirror to be turned on; or when the resolution of the local dynamic image is less than or equal to the physical resolution of the projection display chip, the vibrating mirror control module is further configured to control the vibrating mirror to be turned off.

In some embodiments, when the image identifying module identifies that the projected image is the network playback dynamic image, the resolution extraction module is further configured to extract a playback resolution of a current network playback dynamic image; wherein when the playback resolution of the current network playback dynamic image is greater than the physical resolution of the projection display chip, the vibrating mirror control module is further configured to control the vibrating mirror to be turned on; or when the playback resolution of the current network playback dynamic image is less than or equal to the physical resolution of the projection display chip, the vibrating mirror control module is further configured to control the vibrating mirror to be turned off.

In a second aspect, embodiments of the present disclosure provide a vibrating mirror adjustment system. The system includes: the vibrating mirror adjustment apparatus according to the first aspect; and a vibrating mirror, a projection imaging lens, and the projection display chip, the vibrating mirror being disposed between the projection display chip and the projection imaging lens; wherein an on or off state of the vibrating mirror is controlled by the vibrating mirror control module;

the projection display chip is configured to modulate an illumination light beam emitted by a projection illumination light source into an image light beam of a projected image; and the projection imaging lens is configured to amplify and shape the image light beam.

In a third aspect, embodiments of the present disclosure provide a vibrating mirror adjustment method. The method includes:

acquiring information feature of a projected image;

identifying a category of the projected image based on the information feature of the projected image;

extracting resolution information corresponding to the projected image based on the category of the projected image;

acquiring a comparison result between the resolution information of the projected image and a physical resolution of a projection display chip; and controlling an on or off state of the vibrating mirror based on the comparison result.

In some embodiments, the category of the projected image includes a static image, a local dynamic image, and a network playback dynamic image.

In some embodiments, when the projected image is the static image, an output resolution of the static image is extracted; wherein when the output resolution of the static image is greater than the physical resolution of the projection display chip, the vibrating mirror is controlled to be turned on; or when the output resolution of the static image is less than or equal to the physical resolution of the projection display chip, the vibrating mirror is controlled to be turned off.

In some embodiments, when the projected image is the local dynamic image, a resolution of the local dynamic image is extracted according to front-end information of the local dynamic image; wherein when the resolution of the local dynamic image is greater than the physical resolution of the projection display chip, the vibrating mirror is controlled to be turned on; or when the resolution of the local dynamic image is less than or equal to the physical resolution of the projection display chip, the vibrating mirror is controlled to be turned off.

In some embodiments, when the projected image is the network playback dynamic image, a playback resolution of a current network playback dynamic image is extracted; wherein when the playback resolution of the current network playback dynamic image is greater than the physical resolution of the projection display chip, the vibrating mirror is controlled to be turned on; or when the playback resolution of the current network playback dynamic image is less than or equal to the physical resolution of the projection display chip, the vibrating mirror is controlled to be turned off.

In a fourth aspect, embodiments of the present disclosure provide a projector. The projector includes:

a vibrating mirror; and a microcontroller capable of controlling the vibrating mirror to be turned on or turned off; wherein the microcontroller is configured to perform the vibrating mirror adjustment method according to the third aspect during controlling imaging and displaying of the projector.

In a fifth aspect, embodiments of the present disclosure provide a storage medium. The storage medium stores at least one executable instruction. The at least one executable instruction, when executed by a microcontroller, causes the microcontroller to perform the vibrating mirror adjustment method according to the third aspect.

In a sixth aspect, embodiments of the present disclosure further provide a computer program product. The computer program product includes at least one program stored in a storage medium. The computer program includes at least one program instruction, which, when executed by a microcontroller, causes the microcontroller to perform the vibrating mirror adjustment method according to the third aspect.

As compared with the related art, the present disclosure provides a vibrating mirror adjustment apparatus, a vibrating mirror adjustment system, a vibrating mirror adjustment method, and a projector by four embodiments. The vibrating mirror adjustment apparatus identifies the category of the projected image and the resolution information corresponding to the projected image based on the acquired information feature of the projected image, then identifies whether vibration of the vibrating mirror is used to improve a resolution of an image, and further automatically controls the on or off state of the vibrating mirror, such that an optimal projection display effect is achieved, and visual enjoyment of a user is greatly improved.

BRIEF DESCRIPTION OF THE DRAWINGS

One or more embodiments are illustrated by way of example, and not by limitation, in the figures of the accompanying drawings, wherein modules and steps having the same reference numeral designations represent like modules and steps throughout. The drawings are not to scale, unless otherwise disclosed.

DETAILED DESCRIPTION

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For clearer descriptions of the objectives, technical solutions, and advantages of the present disclosure, the present disclosure is further described with reference to specific embodiments and attached drawings. It should be understood that the specific embodiments described herein are only intended to explain the present disclosure instead of limiting the present disclosure.

It should be noted that, in the absence of conflict, embodiments of the present disclosure and features in the embodiments may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated.

The embodiments of the present disclosure provide a vibrating mirror adjustment apparatus, system and method, and a projector. The vibrating mirror adjustment apparatus acquires image feature information of a projected image, extracts a resolution of the projected image based on the image feature information and a category of the projected image, and turns on or turns off a vibrating mirror by comparing the resolution of the projected image with a physical resolution of a projection display chip.

Hereinafter, the embodiments of the present disclosure are further illustrated with reference to the accompanying drawings.

First Embodiment

Figure 1:
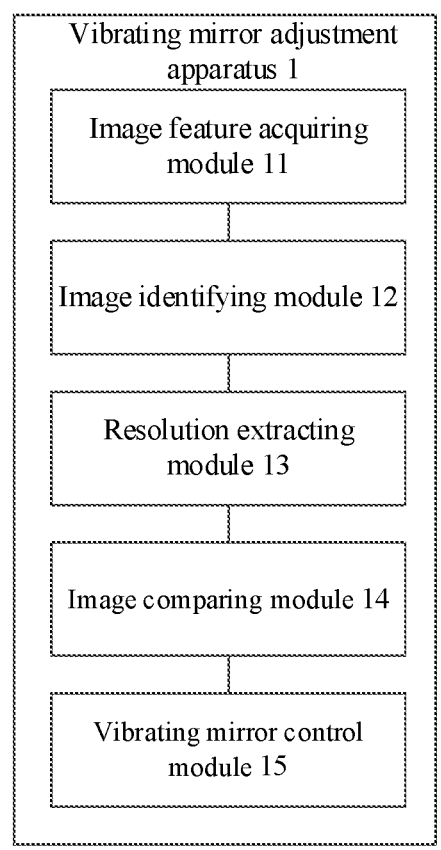
FIG. 1 is a schematic structural diagram of a vibrating mirror adjustment apparatus according to a first embodiment of the present disclosure.

Referring to FIG. 1, FIG. 1 is a schematic structural diagram of a vibrating mirror adjustment apparatus 1 according to a first embodiment of the present disclosure. The vibrating mirror adjustment apparatus 1 includes: an image feature acquiring module 11, an image identifying module 12, a resolution extracting module 13, an image comparing module 14, and a vibrating mirror control module 15. The vibrating mirror adjustment apparatus 1 is capable of adjusting an on or off state of a vibrating mirror based on information feature of a projected image.

The vibrating mirror adjustment apparatus 1 according to the embodiment of the present disclosure is applicable to a plurality of projection devices or projection apparatuses which have a requirement of improving a projection resolution, for example, projectors for household use, the projection apparatuses in cinemas, or some large projection devices that project images to an air or an object. The projector, the projection apparatus, or the projection device needs to be internally provided with a vibrating mirror as a controlled object of the vibrating mirror adjustment apparatus 1.

The image feature acquiring module 11 is configured to acquire information feature of a projected image. In an embodiment of the present disclosure, the image feature acquiring module 11 is capable of reading or decoding and reading front-end information of an image.

The image identifying module 12 is configured to identify a category of the projected image based on the information feature of the projected image. In an embodiment of the present disclosure, the image identifying module 12 is capable of identifying a category of the projected image based on a file format of the projected image.

The resolution extracting module 13 is configured to extract resolution information corresponding to the projected image based on the category of the projected image. In an embodiment of the present disclosure, the resolution extracting module 13 is capable of extracting resolution information of the projected image from the information feature of the projected image based on the category of the projected image.

The image comparing module 14 is configured to acquire a comparison result between the resolution information of the projected image and a physical resolution of a projection display chip. In an embodiment of the present disclosure, the image comparing module 14 is capable of acquiring, by comparison and analysis, a comparison result between the resolution information of the projected image and a physical resolution of a projection display chip, and sending the comparison result to the vibrating mirror control module 15.

The vibrating mirror control module 15 is configured to control an on or off state of the vibrating mirror based on the comparison result. In an embodiment of the present disclosure, the vibrating mirror control module 15 is capable of controlling the vibrating mirror to be vibrated back and forth at a frequency within an angle, and is connected to the vibrating mirror, wherein the connection may be practiced by direct contact, or by an indirect form capable of transmitting vibration. The vibration angle and vibration frequency are determined according to pixels of the projection display chip actually used and an angle at which the light reaches the projection display chip.

The category of the projected image includes a static image, a local dynamic image, and a network playback dynamic image. In an embodiment of the present disclosure, the static image includes one or more pictures that are locally stored or downloaded from the Internet; the local dynamic image includes a dynamic image that is locally stored and can be directly played; and the network playback dynamic image includes a dynamic image that is downloaded and buffered and played via the Internet, for example, a video image that is played by a client of a smart terminal, such as YOUKU, iQIYI, and the like video playback clients.

When the image identifying module 12 identifies that the projected image is the static image, the resolution extracting module 13 extracts an output resolution of the static image. When the output resolution of the static image is greater than the physical resolution of the projection display chip, the vibrating mirror control module 15 controls the vibrating mirror to be turned on. When the output resolution of the static image is less than or equal to the physical resolution of the projection display chip, the vibrating mirror control module 15 controls the vibrating mirror to be turned off.

The output resolution of the static image refers to a maximum resolution at which the static image is displayed/printed/output, the image feature acquiring module 11 is capable of directly acquiring the information feature of the static image, and the resolution extracting module 13 directly extracts the output resolution from the information feature of the projected image, wherein the information feature includes the output resolution.

When the image identifying module 12 identifies that the projected image is the local dynamic image, the resolution extracting module 13 extracts a resolution of the local dynamic image according to front-end information of the local dynamic image; wherein when the resolution of the local dynamic image is greater than the physical resolution of the projection display chip, the vibrating mirror control module 15 controls the vibrating mirror to be turned on; and when the resolution of the local dynamic image is less than or equal to the physical resolution of the projection display chip, the vibrating mirror control module 15 controls the vibrating mirror to be turned off.

The image feature acquiring module 11 extracts the front-end information of the local dynamic image, and extracts the information feature such as resolution, frame rate, video format, or the like of the local dynamic image by selecting a matched decoding mode according to a coding mode of the local dynamic image in the front-end information, such that the resolution extracting module 13 is capable of determining the resolution of the local dynamic image from the above information feature.

When the image identifying module 12 identifies that the projected image is the network playback dynamic image, the resolution extracting module 13 extracts a resolution of the network playback dynamic image according to front-end information of the network playback dynamic image; wherein when the resolution of the network playback dynamic image is greater than the physical resolution of the projection display chip, the vibrating mirror control module 15 controls the vibrating mirror to be turned on; and when the resolution of the network playback dynamic image is less than or equal to the physical resolution of the projection display chip, the vibrating mirror control module 15 controls the vibrating mirror to be turned off.

The image feature acquiring module 11 is capable of directly acquiring the information feature of the network playback dynamic image, and the resolution extracting module 13 is capable of directly extracting the output resolution from the information feature of the projected image, wherein the information feature includes the a currently defined playback resolution, or a currently defined maximum playback resolution. For example, when a dynamic image, that is, a video, is being played via iQIYI, a user may set a standard definition playback mode or a high definition playback mode, and different playback modes correspond to different playback resolutions, such that the magnitude of a current playback resolution needs to be detected; if the detection is needed, and meanwhile when a user has chosen a pre-playback resolution or playback mode via a remote control, the magnitude of the current preset playback resolution is directly acquired.

An embodiment of the present disclosure provides a vibrating mirror adjustment apparatus 1. In combination with the information feature of the projected image that is pre-acquired and needs to be projected, the vibrating mirror adjustment apparatus 1 is capable of identifying, based on the information feature of different images, whether vibration of the vibrating mirror is used to improve a resolution of an image, and the on or off state of the vibrating mirror is further smartly and automatically controlled, such that an optimal projection display effect is acquired, and visual enjoyment of a user is improved.

Second Embodiment

Figure 2:
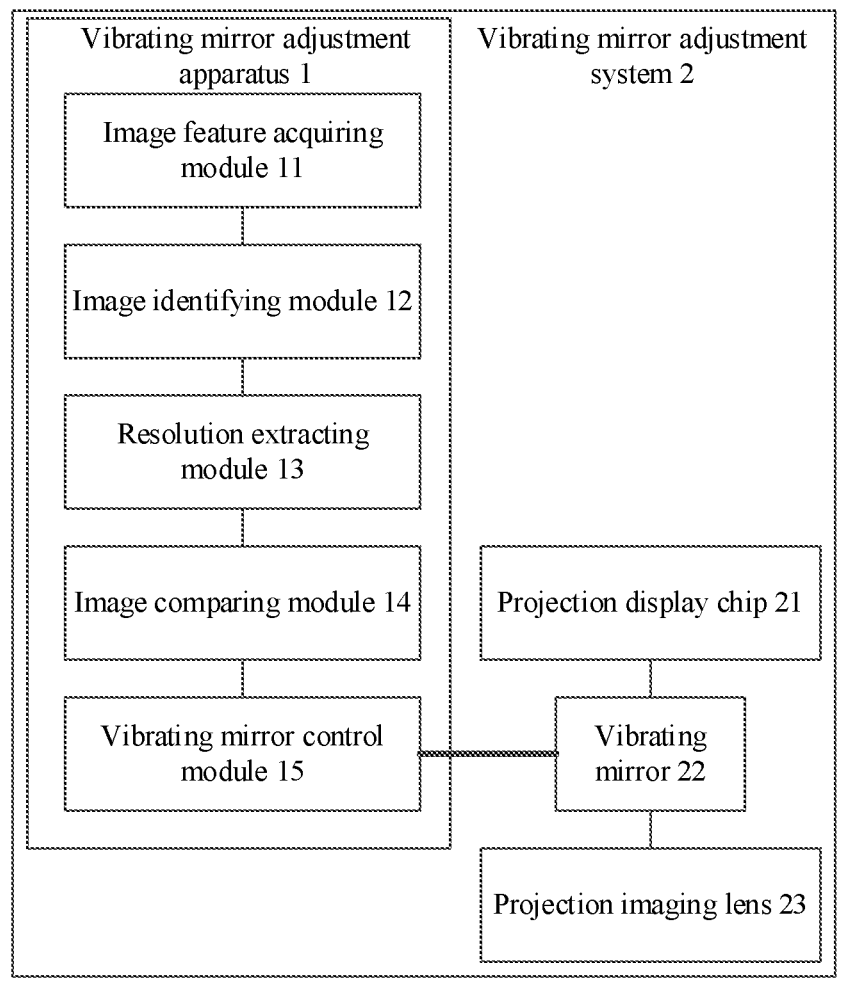
FIG. 2 is a schematic structural diagram of a vibrating mirror adjustment system according to a second embodiment of the present disclosure.

Referring to FIG. 2, FIG. 2 is a schematic structural diagram of a vibrating mirror adjustment system 2 according to a second embodiment of the present disclosure. The vibrating mirror adjustment system 2 includes: the vibrating mirror adjustment apparatus 1, and a vibrating mirror adjustment 22, a projection imaging lens 23, and a projection display chip 21. The vibrating mirror adjustment system 2 is capable of adjusting an on or off state of the vibrating mirror 22 based on information feature of a projected image.

The vibrating mirror adjustment system 2 according to the embodiment of the present disclosure is applicable to a plurality of projection devices or projection apparatuses which have a requirement of improving a projection resolution, for example, projectors for household use, the projection apparatuses in cinemas, or some large projection devices that project images to an air or an object.

The projection display chip 21 is configured to modulate an illumination light beam emitted by a projection illumination light source into an image light beam of the projected image. The projection display chip 21 has a fixed physical resolution. In an embodiment of the present disclosure, the projection display chip 21 may be designed as a DMD chip or an LCOS chip. In some other embodiments, the projection display chip 21 may also be other types of chips capable of implementing projection display.

The vibrating mirror 22 is disposed between the projection display chip 21 and the projection imaging lens 23. The on or off state of the vibrating mirror 22 is controlled by a vibrating mirror control module 15. The vibrating mirror 22 is capable of deflecting the image light beam of the projected image from the projection display chip 21.

In an embodiment of the present disclosure, the vibrating mirror control module 15 is capable of controlling the vibrating mirror 22 to be vibrated back and forth at a frequency within an angle, and is connected to the vibrating mirror 22, wherein the connection may be practiced by direct contact, or by an indirect form capable of transmitting vibration. In some other embodiments of the present disclosure, the vibration angle and vibration frequency are determined according to pixels of the projection display chip 21 actually used and an angle at which the light reaches the projection display chip 21.

The projection imaging lens 23 is configured to amplify and shape the image light beam. The projection imaging lens 23 may be an optical lens or a lens set that is capable of changing an imaging effect of an original projected image by causing distortion to the light beam, wherein imaging effect of the projected image includes color, proportion, or the like of the image.

It should be noted that the vibrating mirror adjustment apparatus 1 in this embodiment and the vibrating mirror adjustment apparatus 1 in the first embodiment are based on the same inventive concept, which is not detailed herein.

An embodiment of the present disclosure provides a vibrating mirror system 2. In combination with the information feature of the projected image that is pre-acquired and needs to be projected, the vibrating mirror system 2 is capable of identifying, based on the information feature of different images, whether vibration of the vibrating mirror is used to improve a resolution of an image, and the on or off state of the vibrating mirror is further smartly and automatically controlled, such that an optimal projection display effect is acquired, and visual enjoyment of a user is improved.

Third Embodiment

Referring to FIG. 3, FIG. 4, FIG. 5, FIG. 6, and FIG. 7, FIG. 3 is a schematic flowchart of a vibrating mirror adjustment method according to a third embodiment of the present disclosure. An embodiment of the present disclosure provides a vibrating mirror adjustment method. The vibrating mirror adjustment method is applicable to a scenario where a photographing device is turned on, for example, Android or other systems are normally booted and projection is started. By the method, the vibrating mirror is adjusted. The method includes, but is not limited to, the following steps:

In step 101, information feature of a projected image is acquired.

In an embodiment of the present disclosure, front-end information of an image needs to be read or decoded and read, such that the information feature of a related image is acquired. The information feature of the image includes, but is not limited to, an output resolution of a static image, a coding mode and a resolution of a local dynamic image, or a playback resolution of a network playback dynamic image.

In step 102, a category of the projected image is identified based on the information feature of the projected image.

In an embodiment of the present disclosure, a category of the projected image is identified based on a file format of the projected image.

In step 103, resolution information corresponding to the projected image is extracted based on the category of the projected image.

In an embodiment of the present disclosure, resolution information of the projected image is extracted from the information feature of the projected image based on the category of the projected image.

In step 104, a comparison result between the resolution information of the projected image and a physical resolution of a projection display chip is acquired.

In an embodiment of the present disclosure, a comparison result between the resolution information of the projected image and a physical resolution of a projection display chip is acquired by comparison and analysis, and the comparison result is sent to the vibrating mirror control module.

In step 105, an on or off state of the vibrating mirror is controlled based on the comparison result.

The category of the projected image includes a static image 31, a local dynamic image 32, and a network playback dynamic image 33.

Figure 4:
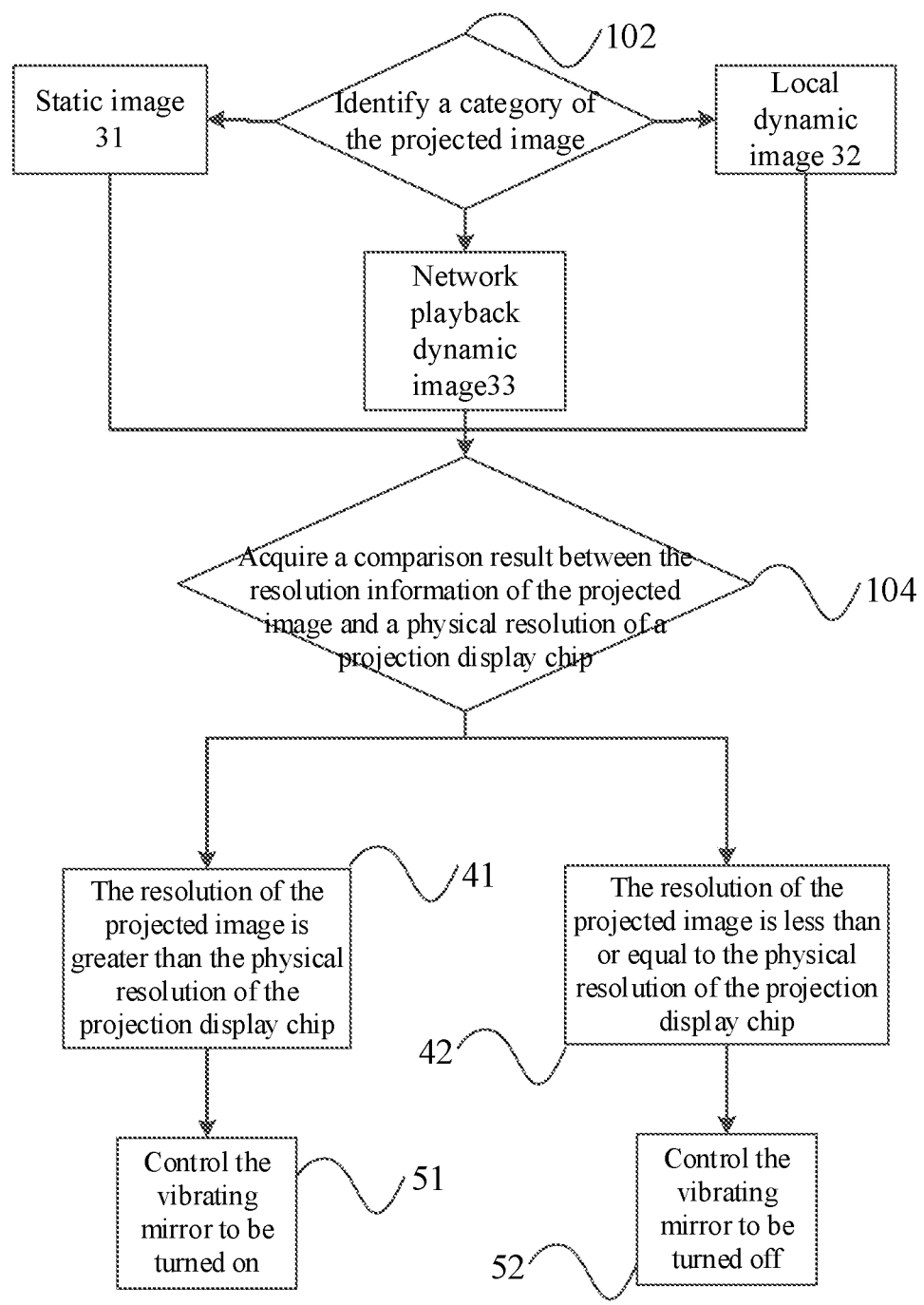
FIG. 4 is a schematic flowchart of a method for controlling an on or off state of the vibrating mirror based on a category of a projected image according to the third embodiment of the present disclosure.

In practice, referring to FIG. 4, FIG. 4 is a schematic flowchart of a method for controlling an on or off state of the vibrating mirror based on a category of a projected image according to the third embodiment of the present disclosure. First, in step 102, the category of the projected image is specifically identified as the static image 31, the local dynamic image 32, or the network playback dynamic image 33. Second, in step 104, the comparison result between the resolution information of the projected image and the physical resolution of the projection display chip is acquired. With respect to different categories of the projected images, the resolution information of the projected images extracted in step 103 is different. Finally, in step 105, the on or off state of the vibrating mirror is controlled based on the comparison result.

Two options are available to the comparison result and the on or off state of the vibrating mirror. In a first option, that is, in a comparison result 41, when the resolution of the projected image is greater than the physical resolution of the projection display chip; and in an on or off state 51, the vibrating mirror is controlled to be turned on. In a second option, that is, in a comparison result 42, when the resolution of the projected image is less than or equal to the physical resolution of the projection display chip; and in an on or off state 52, the vibrating mirror is controlled to be turned off.

Specifically, the method for controlling the on or off state of the vibrating mirror based on the category of the projected image in steps 102 to 105 involves three cases.

Figure 5:
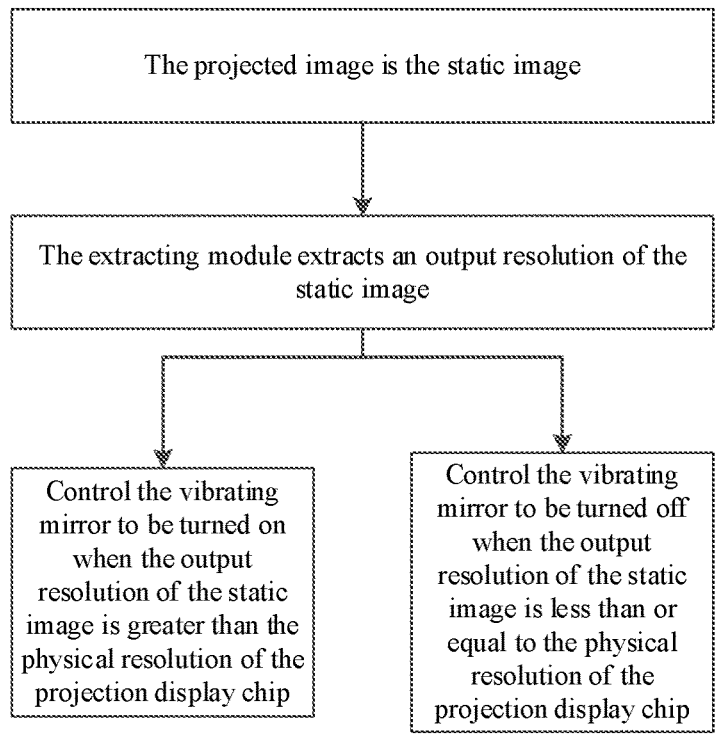
FIG. 5 is a schematic flowchart of a first case of the control method as illustrated in FIG. 4.

First, referring to FIG. 5, FIG. 5 is a schematic flowchart of a first case of the control method as illustrated in FIG. 4. When the projected image is the static image, an output resolution of the static image is extracted. When the output resolution of the static image is greater than the physical resolution of the projection display chip, the vibrating mirror is controlled to be turned on. when the output resolution of the static image is less than or equal to the physical resolution of the projection display chip, the vibrating mirror is controlled to be turned off.

The output resolution of the static image 31 refers to a maximum resolution at which the static image 31 is displayed/printed/output, by directly acquiring the information feature of the static image 31, the output resolution is finally directly extracted from the information feature of the projected image, wherein the information feature includes the output resolution.

Figure 6:
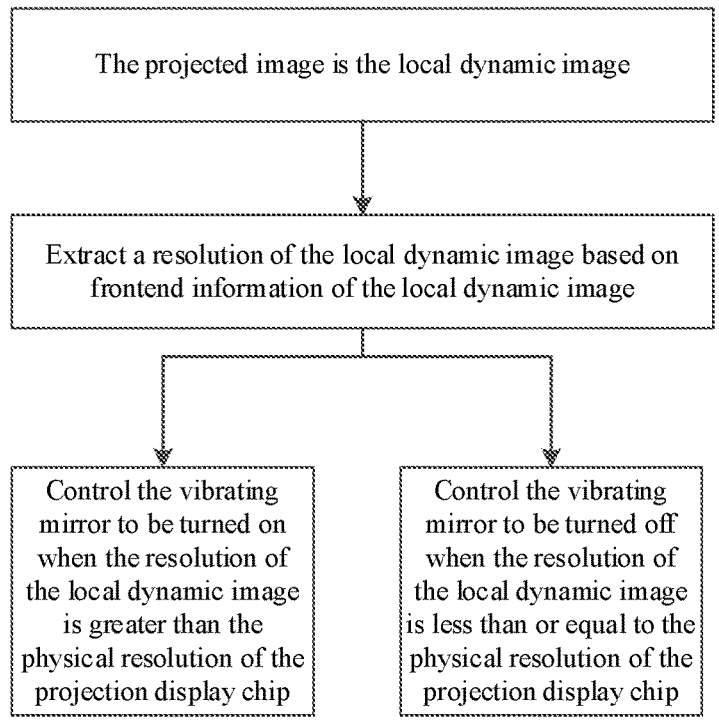
FIG. 6 is a schematic flowchart of a second case of the control method as illustrated in FIG. 4.

Referring to FIG. 6, FIG. 6 is a schematic flowchart of a second case of the control method as illustrated in FIG. 4. When the image identifying module identifies that the projected image is the local dynamic image, a resolution of the local dynamic image is extracted according to front-end information of the local dynamic image. When the resolution of the local dynamic image is greater than the physical resolution of the projection display chip, the vibrating mirror is controlled to be turned on. when the resolution of the local dynamic image is less than or equal to the physical resolution of the projection display chip, the vibrating mirror is controlled to be turned off.

The resolution of the local dynamic image refers to the extracted resolution of the local dynamic image from the information feature such as resolution, frame rate, video format, or the like of the local dynamic image 32 by selecting a matched decoding mode based on a coding mode of the local dynamic image 32 in the front-end information.

Figure 7:
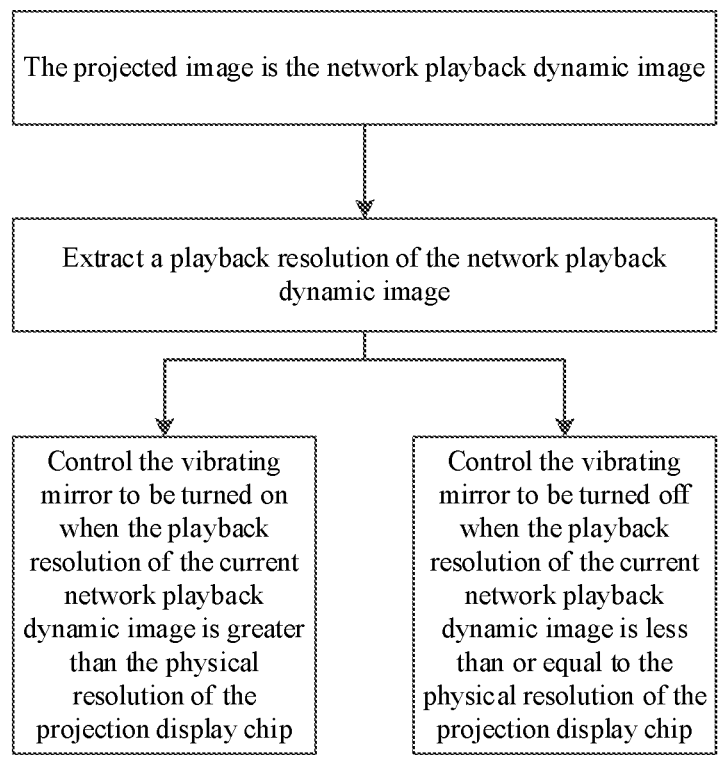
FIG. 7 is a schematic flowchart of a third case of the control method as illustrated in FIG. 4.

Referring to FIG. 7, FIG. 7 is a schematic flowchart of a third case of the control method as illustrated in FIG. 4. When the projected image is the network playback dynamic image, a playback resolution of a current network playback dynamic image is extracted. When the playback resolution of the current network playback dynamic image is greater than the physical resolution of the projection display chip, the vibrating mirror is controlled to be turned on. when the playback resolution of the current network playback dynamic image is less than or equal to the physical resolution of the projection display chip, the vibrating mirror is controlled to be turned off.

The playback resolution of the network playback dynamic image 33 refers to a currently defined playback resolution included in the information feature, or a currently predefined maximum playback resolution. For example, when a dynamic image, that is, a video, is being played via iQIYI, a user may set a standard definition playback mode or a high definition playback mode, and different playback modes correspond to different playback resolutions.

The vibrating mirror adjustment method according to the embodiment of the present disclosure is applicable to a plurality of projection devices or projection apparatuses which have a requirement of improving a projection resolution, for example, projectors for household use, the projection apparatuses in cinemas, or some large projection devices that project images to an air or an object. Specifically, the vibrating mirror adjustment method is implemented by a microcontroller in the above apparatus or device, or by a control apparatus have a storage space.

An embodiment of the present disclosure provides a vibrating mirror adjustment method. In combination with the information feature of the projected image that is pre-acquired and needs to be projected, the vibrating mirror adjustment method is capable of identifying, based on the information feature of different images, whether vibration of the vibrating mirror is used to improve a resolution of an image, and the on or off state of the vibrating mirror is further smartly and automatically controlled, such that an optimal projection display effect is acquired, and visual enjoyment of a user is improved.

Fourth Embodiment

Figure 8:
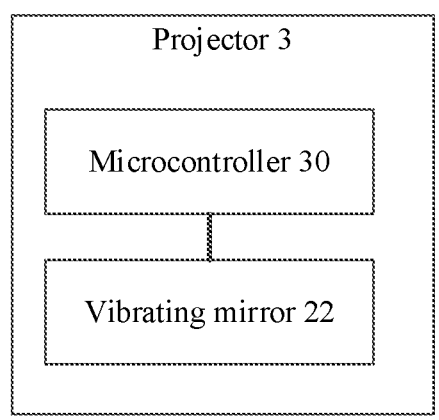
FIG. 8 is a schematic structural diagram of a projector according to a fourth embodiment of the present disclosure.
Figure 9:
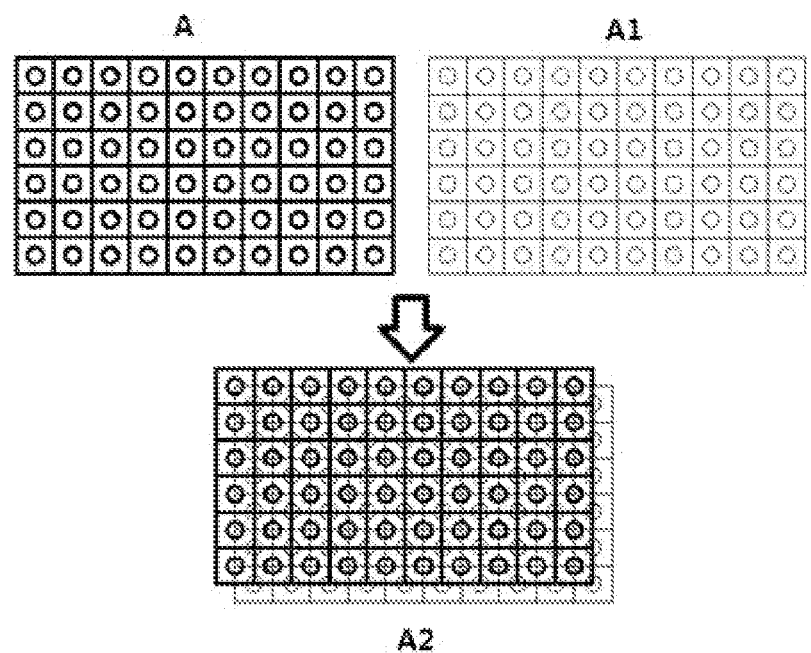
FIG. 9 is a schematic structural diagram of pixel superimposition of the projected image based on vibration of the vibrating mirror according to the fourth embodiment of the present disclosure.

Referring to FIG. 8 and FIG. 9, FIG. 8 is a schematic structural diagram of a projector according to a fourth embodiment of the present disclosure. A projector 3 includes but is not limited to a vibrating mirror 22, and a microcontroller 30 capable of controlling the vibrating mirror 22 to be turned on or turned off, wherein the microcontroller 30 is configured to perform the vibrating mirror adjustment method as defined in the third embodiment during controlling imaging and displaying of the projector 3.

The vibrating mirror 22 is an optical lens or an optical lens set capable of deflecting an image light beam of a projected image. Referring to FIG. 9, FIG. 9 is a schematic diagram of pixel superposition of a projected image based on vibration of the vibrating mirror. When the image light beam is incident to the vibrating mirror 22, the vibrating mirror causes, by vibration, the image light beams corresponding to two adjacent frames of the projected images (A and A1) passing through the vibrating mirror 22 to be not completely overlapped, the image light beams corresponding to the two adjacent frames of the projected images are sequentially directed to a projection imaging lens, and the projected image is the displayed image (A2) presented after the image light beams pass through the projection imaging lens. In an embodiment of the present disclosure, each time the vibrating mirror 22 vibrates, the projected image from a projection display chip is caused to generate an offset distance by one-half pixel, such that the field of view is expanded and hence the resolution is improved. This may achieve a best visual effect after the offset images are superimposed. Nevertheless, the offset distance is not limited to one-half pixel. In some other embodiments, each time the vibrating mirror 22 vibrates, the projected image of the projection display chip may have offset distances with other magnitudes according to the actual needs. When the vibrating mirror 22 operates, the vibrating mirror 22 is turned on or turned off in response to a turn-on or turn-off instruction from the microcontroller 30, thereby achieving an optimal projection display effect.

The microcontroller 30 is a microcomputer, and is configured to set various parameters, acquire various parameters, store various parameters, receive various information, process various information, and send various information and instructions. The microcontroller 30 is further configured to extract the information feature of the projected image, determine whether the vibrating mirror 22 needs to be turned on to improve an image resolution based on different information feature, and send a turn-on or turn-off instruction to the vibrating mirror 22, thereby controlling the on or off state of the vibrating mirror 22.

The microcontroller 30 includes, but is not limited to, all modules in the vibrating mirror adjustment apparatuses as described in first and second embodiments. Data transmission/communication/connection between the vibrating mirror 22 and the microcontroller 30 may be practiced in a wireless or wired fashion. The vibrating mirror 22 and the microcontroller 30 may be integrated as a single device or may be also more than two independent devices each including one or more modules.

The projector 3 may be a vibrating mirror adjustment system as described in the second embodiment, and the microcontroller 30 may be any vibrating mirror adjustment apparatus as described in the first and second embodiments. The on or off state of the vibrating mirror 22 is controlled by the vibrating mirror adjustment apparatus, and in the vibrating mirror adjustment system, the vibrating mirror is connected to the projection display chip and the projection imaging lens respectively. The practical presentation, installation and position of the installation, and connection of the various modules, the vibrating mirror 22, the projection display chip and the projection imaging lens in the vibrating mirror adjustment apparatus may be designed according to the actual needs, which are not limited to the embodiments of the present disclosure. Data processing capabilities, connection, and configuration in the same device or not of the image feature acquiring module, the image identifying module, the resolution extracting module, the image comparing module, and the vibrating mirror control module in the vibrating mirror adjustment apparatus may be designed according to the actual needs, which are not limited to the embodiments of the present disclosure.

Figure 3:
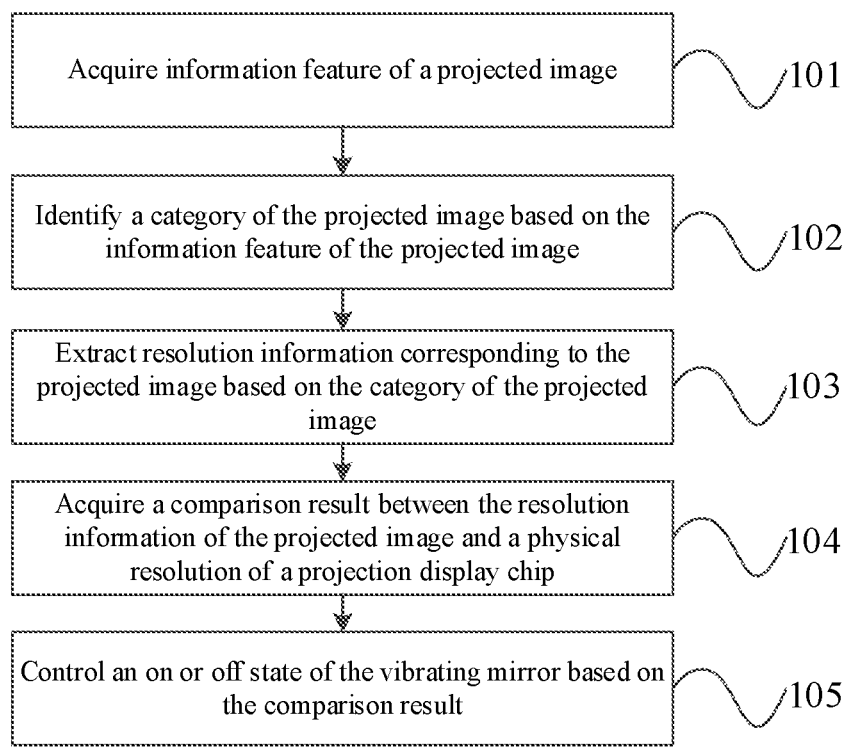
FIG. 3 is a schematic flowchart of a vibrating mirror adjustment method according to a third embodiment of the present disclosure.

An embodiment of the present disclosure further provides a storage medium. The storage medium stores at least one executable instruction, which, when executed by at least one processor, for example, the microcontroller 30, causes the at least one processor to perform the vibrating mirror adjustment method according to any of the method embodiments described above, for example, performing steps 101 to 105 in the method according to the third embodiment as illustrated in FIG. 3.

The apparatus embodiments described above are merely illustrative. The vibrating mirror 22 and the microcontroller 30 may be or may not be integrally installed, may be integrally connected to each other by directly using ports or pins, or may be remotely connected to each other by an electrical wire or an electrical signal, and may be located in one place or distributed to different places. Part or all of the modules of the microcontroller 30 may be selected according to the actual needs to achieve the objectives of the technical solutions of the embodiments.

According to the above embodiments of the present disclosure, a person skilled in the art may clearly understand that the embodiments of the present disclosure may be implemented by means of hardware or by means of software plus a necessary general hardware platform. Persons of ordinary skill in the art may understand that all or part of the steps of the methods in the embodiments may be implemented by a program instructing relevant hardware. The program may be stored in a non-transitory computer-readable storage medium and may be executed by at least one processor. When the program runs, the steps of the methods in the embodiments are performed. The instruction is stored in the microcontroller, which may be any microcomputer.

The product is capable of performing the method according to the third embodiment of the present disclosure, has corresponding function modules for performing the method, and achieves the corresponding beneficial effects. For technical details that are not illustrated in detail in this embodiment, reference may be made to the description of the methods according to the embodiments of the present disclosure.

By the structural design according to the embodiments of the present disclosure, an embodiment of the present disclosure provides a projector 3. In combination with the information feature of the projected image that is pre-acquired and needs to be projected, the projector 3 is capable of identifying, based on the information feature of different images, whether vibration of the vibrating mirror 22 is used to improve a resolution of an image, and the on or off state of the vibrating mirror is further smartly and automatically controlled, such that an optimal projection display effect is acquired, and visual enjoyment of a user is improved.

The present disclosure provides a vibrating mirror adjustment apparatus, a vibrating mirror adjustment system, a vibrating mirror adjustment method, and a projector by four embodiments. The vibrating mirror adjustment apparatus identifies the category of the projected image and the resolution information corresponding to the projected image based on the acquired information feature of the projected image, then identifies whether vibration of the vibrating mirror is used to improve a resolution of an image, and further automatically controls the on or off state of the vibrating mirror, such that an optimal projection display effect is achieved, and visual enjoyment of a user is greatly improved.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A vibrating mirror adjustment system, comprising:
a vibrating mirror adjustment apparatus, comprising:
an image feature acquiring module, configured to acquire information feature of a projected image;
an image identifying module, configured to identify a category of the projected image based on the information feature of the projected image;
a resolution extracting module, configured to extract resolution information corresponding to the projected image based on the category of the projected image;
an image comparing module, configured to acquire a comparison result between the resolution information of the projected image and a physical resolution of a projection display chip; and
a vibrating mirror control module, configured to control an on or off state of the vibrating mirror based on the comparison result; and
a vibrating mirror, a projection imaging lens, and the projection display chip, the vibrating mirror being disposed between the projection display chip and the projection imaging lens; wherein
an on or off state of the vibrating mirror is controlled by the vibrating mirror control module;
the projection display chip is configured to modulate an illumination light beam emitted by a projection illumination light source into an image light beam of a projected image; and
the projection imaging lens is configured to amplify and shape the image light beam.

2. The vibrating mirror adjustment system according to claim 1, wherein
the category of the projected image comprises a static image, a local dynamic image, and a network playback dynamic image.

3. The vibrating mirror adjustment system according to claim 2, wherein
when the image identifying module identifies that the projected image is the static image, the resolution extracting module is further configured to extract an output resolution of the static image; wherein
when the output resolution of the static image is greater than the physical resolution of the projection display chip, the vibrating mirror control module is further configured to control the vibrating mirror to be turned on; or
when the output resolution of the static image is less than or equal to the physical resolution of the projection display chip, the vibrating mirror control module is further configured to control the vibrating mirror to be turned off.

4. The vibrating mirror adjustment system according to claim 2, wherein
when the image identifying module identifies that the projected image is the local dynamic image, the resolution extracting module is further configured to extract a resolution of the local dynamic image according to front-end information of the local dynamic image; wherein
when the resolution of the local dynamic image is greater than the physical resolution of the projection display chip, the vibrating mirror control module is further configured to control the vibrating mirror to be turned on; or
when the resolution of the local dynamic image is less than or equal to the physical resolution of the projection display chip, the vibrating mirror control module is further configured to control the vibrating mirror to be turned off.

5. The vibrating mirror adjustment system according to claim 2, wherein
when the image identifying module identifies that the projected image is the network playback dynamic image, the resolution extraction module is further configured to extract a playback resolution of a current network playback dynamic image; wherein when the playback resolution of the current network playback dynamic image is greater than the physical resolution of the projection display chip, the vibrating mirror control module is further configured to control the vibrating mirror to be turned on; or when the playback resolution of the current network playback dynamic image is less than or equal to the physical resolution of the projection display chip, the vibrating mirror control module is further configured to control the vibrating mirror to be turned off.

6. A vibrating mirror adjustment method, comprising:

acquiring information feature of a projected image;

identifying a category of the projected image based on the information feature of the projected image;

extracting resolution information corresponding to the projected image based on the category of the projected image;

acquiring a comparison result between the resolution information of the projected image and a physical resolution of a projection display chip; and controlling an on or off state of the vibrating mirror based on the comparison result.

7. The vibrating mirror adjustment method according to claim 6, wherein the category of the projected image comprises a static image, a local dynamic image, and a network playback dynamic image.

8. The vibrating mirror adjustment method according to claim 7, wherein when the projected image is the static image, an output resolution of the static image is extracted; wherein when the output resolution of the static image is greater than the physical resolution of the projection display chip, the vibrating mirror is controlled to be turned on; or when the output resolution of the static image is less than or equal to the physical resolution of the projection display chip, the vibrating mirror is controlled to be turned off.

9. The vibrating mirror adjustment method according to claim 7, wherein when the projected image is the local dynamic image, a resolution of the local dynamic image is extracted according to front-end information of the local dynamic image; wherein when the resolution of the local dynamic image is greater than the physical resolution of the projection display chip, the vibrating mirror is controlled to be turned on; or when the resolution of the local dynamic image is less than or equal to the physical resolution of the projection display chip, the vibrating mirror is controlled to be turned off.

10. The vibrating mirror adjustment method according to claim 7, wherein when the projected image is the network playback dynamic image, a playback resolution of a current network playback dynamic image is extracted; wherein when the playback resolution of the current network playback dynamic image is greater than the physical resolution of the projection display chip, the vibrating mirror is controlled to be turned on; or when the playback resolution of the current network playback dynamic image is less than or equal to the physical resolution of the projection display chip, the vibrating mirror is controlled to be turned off.

11. A projector, comprising:

a vibrating mirror; and a microcontroller capable of controlling the vibrating mirror to be turned on or turned off; wherein the microcontroller is configured to perform the vibrating mirror adjustment method as defined in claim 6 during controlling imaging and displaying of the projector.

* * * * *